US009482386B2

(12) United States Patent
Balmer (10) Patent No.: US 9,482,386 B2
(45) Date of Patent: Nov. 1, 2016

(54) EXTENDABLE VIEWING SYSTEM AND KIT ALLOWING FOR ASSEMBLY OF EXTENDABLE VIEWING SYSTEM

(71) Applicant: DayMen US, Inc., Petaluma, CA (US)

(72) Inventor: Noah Balmer, Oakland, CA (US)

(73) Assignee: Daymen US, Inc., Petaluma, CA (US)

( * ) Notice: Subject to any disclaimer, the term of this patent is extended or adjusted under 35 U.S.C. 154(b) by 0 days.

(21) Appl. No.: 14/637,403

(22) Filed: Mar. 4, 2015

(65) Prior Publication Data

US 2016/0258576 A1  Sep. 8, 2016

(51) Int. Cl.
*F16M 13/04* (2006.01)
*G03B 17/56* (2006.01)
(52) U.S. Cl.
CPC ............ *F16M 13/04* (2013.01); *G03B 17/561* (2013.01)
(58) Field of Classification Search
CPC .... F16M 11/18; F16M 13/04; G03B 17/561; G03B 17/563

USPC .................... 294/139; 396/420, 428
See application file for complete search history.

(56) References Cited

U.S. PATENT DOCUMENTS

| 5,065,249 | A  | * | 11/1991 | Horn ...................... | F16M 11/04 |
|           |    |   |         |                              | 348/375 |
| 5,786,854 | A  | * | 7/1998  | Slade ..................... | F16M 11/18 |
|           |    |   |         |                              | 348/373 |
| 6,932,305 | B2 | * | 8/2005  | Morales ................. | F16M 11/10 |
|           |    |   |         |                              | 248/125.2 |
| 7,931,412 | B2 | * | 4/2011  | Brown ............... | F16M 11/2035 |
|           |    |   |         |                              | 396/421 |
| 2003/0161622 | A1 | * | 8/2003 | Zantos ................. | E04H 12/182 |
|           |    |   |         |                              | 396/419 |

* cited by examiner

*Primary Examiner* — Dean Kramer
(74) *Attorney, Agent, or Firm* — Michael A. Guth (57) ABSTRACT

An extendable viewing system which allows for the suspension of a camera, or a video recorder, at a distance from the user. The viewing system may have a camera mount which may be rotated by the user. The camera mount may be on a far end of a mounting rod, with the user holding the close end of the mounting rod. The user may rotate a handle to rotate the camera mount.

2 Claims, 9 Drawing Sheets

EXTENDABLE VIEWING SYSTEM AND KIT ALLOWING FOR ASSEMBLY OF EXTENDABLE VIEWING SYSTEM

BACKGROUND

1. Field of the Invention

This invention relates to viewing systems, and more specifically to an extendable viewing system and a kit relating to same.

2. Description of Related Art

Prior to the advent of the latest generations of cameras and video recording devices, cameras were much larger, and these larger units presented a challenge to the user. First, the devices could be quite heavy, and support units for these devices might be body mounted to the user, such that the user's entire body could be called upon to support and stabilize the camera. Second, prior to the image stabilization aspects within cameras themselves, it was more important to stabilize the camera unit than it may be today.

In the extreme, a camera stabilizer such as seen in U.S. Pat. No. 2,945,428, to Dearborn, would incorporate a significant amount of structure, and also be attached to the user's body. In the modern era, it is not uncommon for attendees at an event, such as a parade, to hold a camera by hand, and above their head, in order to record video of the event. Many now have smart phones adapted to record video images. In addition, there are small, lightweight, specialty video cameras.

With the changes in technology, new approaches are needed to support cameras. What is called for is a system that allows for support of a lightweight camera system without the bulky structure of traditional systems.

SUMMARY

An extendable viewing system which allows for the suspension of a camera, or video recorder, at a distance from the user. The viewing system may have a camera mount which may be rotated by the user. The camera mount may be on a far end of a mounting rod, with the user holding the close end of the mounting rod. The user may rotate a handle to rotate the camera mount.

DETAILED DESCRIPTION

Figure 1:
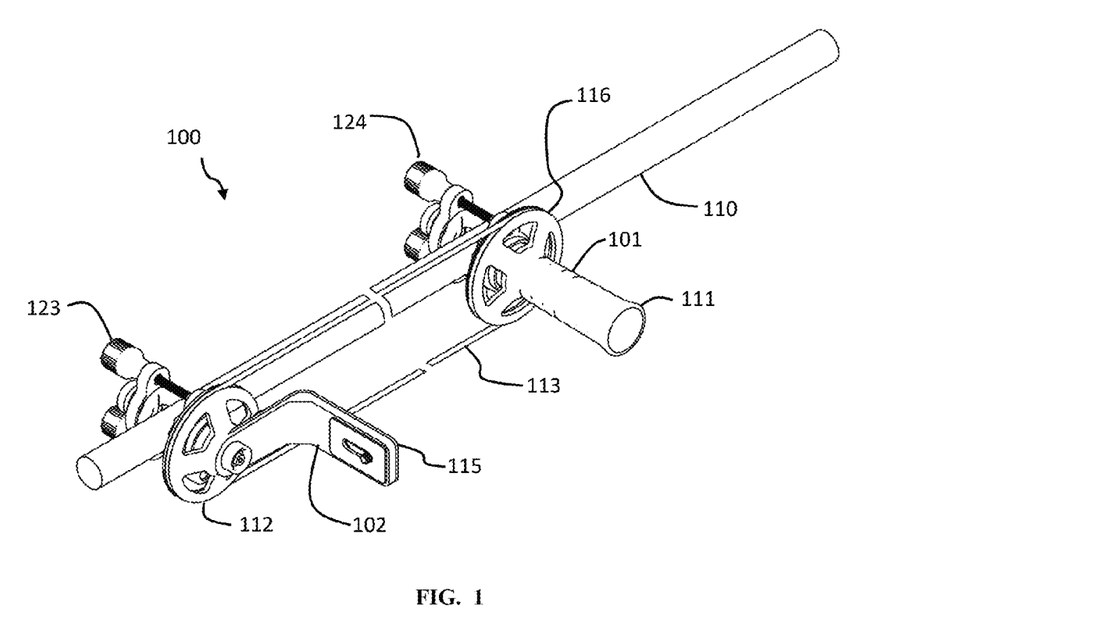
FIG. 1 is a perspective view of an extendable viewing system according to some embodiments of the present invention.
Figure 2:
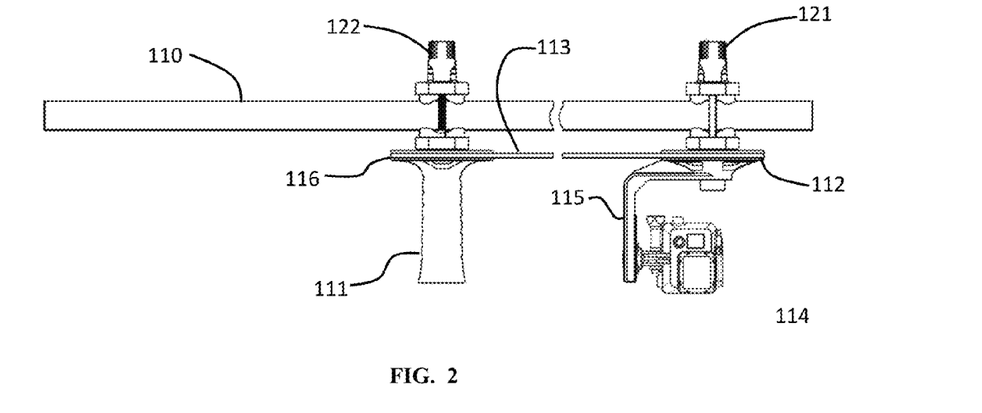
FIG. 2 is a top view of an extendable viewing system according to some embodiments of the present invention.

In some embodiments of the present invention, as seen in FIGS. 1 and 2, an extendable viewing system 100 adapted for supported a camera, video camera, or other similar device is supported on a support rod 110. In some aspects, the drive unit 101 is removably mounted to the support rod 110. The driven unit 102 is also removably attached to the support rod 110. A drive cord 113 links the drive unit 101 to the driven unit 102.

The twist handle 111 is coupled to the device mount 115 such that rotation of the twist handle 111 causes a rotation of the device mount 115. The drive unit 101 has a twist handle 111 adapted to be held, and rotated as need be, but the user. The drive unit 101 also has a drive pulley 116 fixedly coupled to the twist handle 111. The drive unit 101 is attached to or near a first end of the support rod 110. At the far end of the support rod 110 the driven unit 102 is attached. The driven unit 102 has a device mount 115 adapted to receive a device such as a video camera, or a support holder for a camera or similar item. The driven unit 102 has an end pulley 112 fixedly coupled to the device mount 115.

A gripping structure 122 allows for the fastening of the drive unit 101 to the support rod 110. In some aspects, a plurality of threaded clamping members 124 allow the drive unit 101 to be fastened to the support rod 110. A second gripping structure 121 allows for fastening of the driven unit 102 to the support rod 110. The threaded clamping members 123 allow the driven unit 102 to be fastened to the support rod. With the removable clamping members 123, 124 the drive unit 101 and the driven unit 102 can be attached and removed from a support rod. This flexibility allows for the various pieces of the extendable viewing system to be kept together as a kit, for example, and to be put together only when needed to be used.

Figure 3:
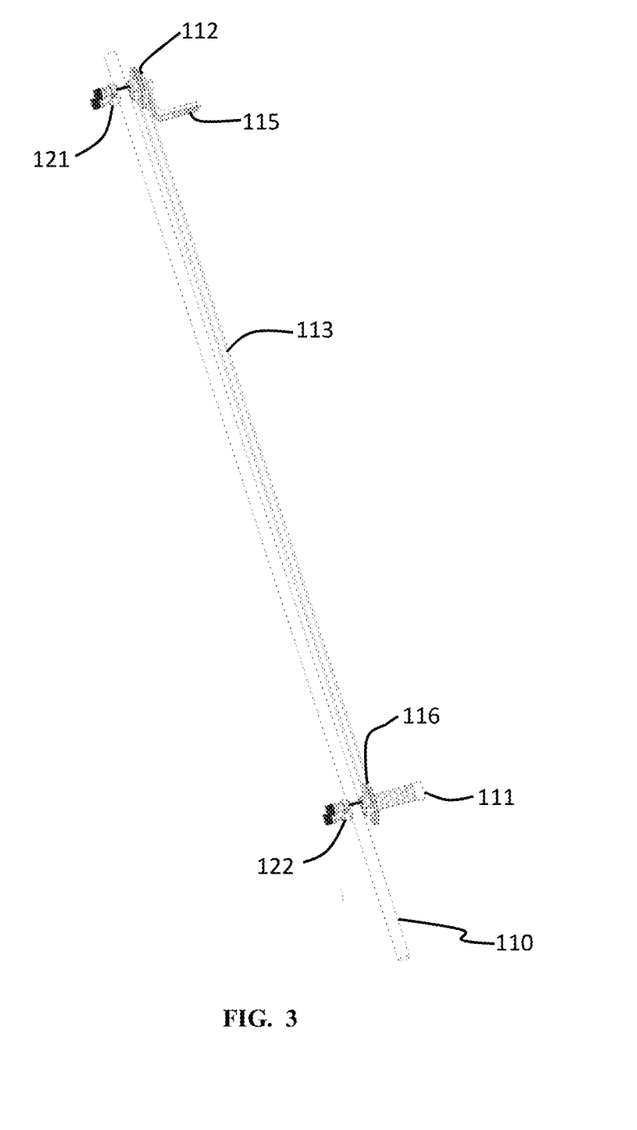
FIG. 3 is a perspective view of an extendable viewing system according to some embodiments of the present invention.
Figure 4:
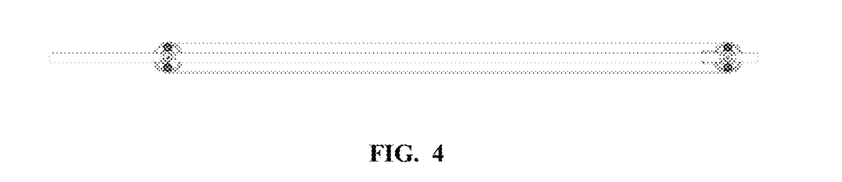
FIG. 4 is a side view of an extendable viewing system according to some embodiments of the present invention.
Figure 5:
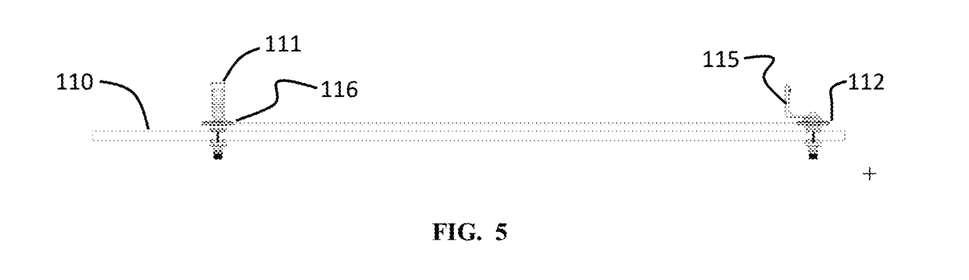
FIG. 5 is a top view of an extendable viewing system according to some embodiments of the present invention.
Figure 6:
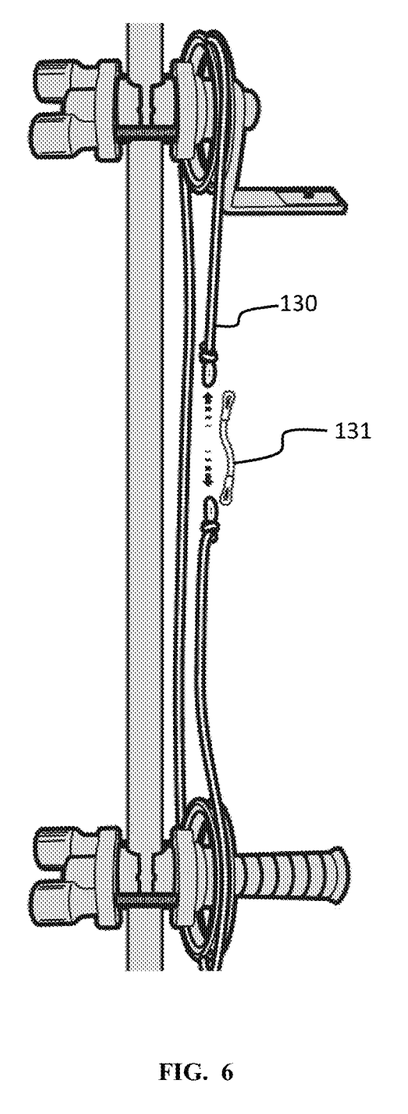
FIG. 6 is an illustration of the drive cord of an extendable viewing system according to some embodiments of the present invention.
Figures 7A, 7B, 7C:
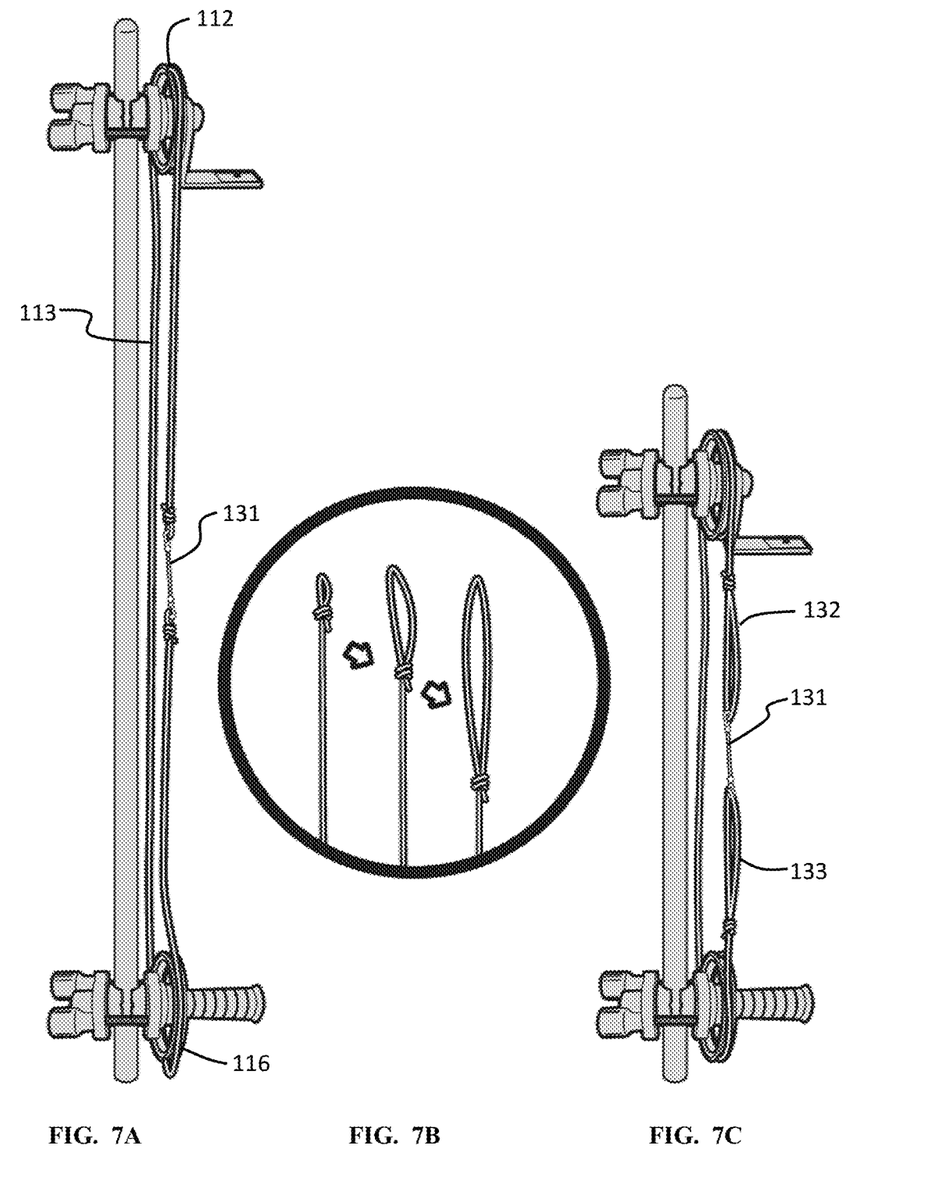
FIGS. 7A-C are illustrations of the variation of the length of the drive cord according to some embodiments of the present invention.

As seen in FIGS. 3, 4, and 5, an extendable viewing system 100 is put together on a support rod 110. The drive cord 113 couples the drive unit 101 to the driven unit 102. The user may hold a device, such as a video camera 114, at a point above the crowd of people, for example. With a turn of the twist handle 111, the drive cord 113 engages the end pulley 112, resulting in the commensurate rotation of the end pulley 112.

FIGS. 6 and 7A-C illustrate aspects of an adjustable drive cord 113 according to some embodiments of the present invention. Adjustment of the length of the drive cord 113 allows for the use of longer or shorter support rods, and allows for variation in the distance between the drive pulley 116 and the end pulley 112. As the device mount 115 typically will only be turned a bit, in the range of approximately 180 degrees of rotation, the drive cord 113 will only have a portion of its length go around a pulley. This allows for a cord design that allows for shortening or lengthening of the cord, as the features used to shorten the cord would not need to be run through a pulley.

A drive cord 113 may consist of a main cord 130 and a cord joiner 131. The main cord 130 may be discontinuous and may be linked together with a joining cord 131. The joining cord 131 may have connectors on each of its ends. The ends of the main cord 130 may have slip loops 132, 133 adapted to allow fastening of the joining cord 131, but also adapted to vary the overall effective length of the drive cord 113. The ends of the main cords, with their slip loops, may allow for the shortening of the drive cord by the slipping of slip knots along the main cord, of using other means. The overall effective length of the drive cord 113 may be set by the user.

Figure 8:
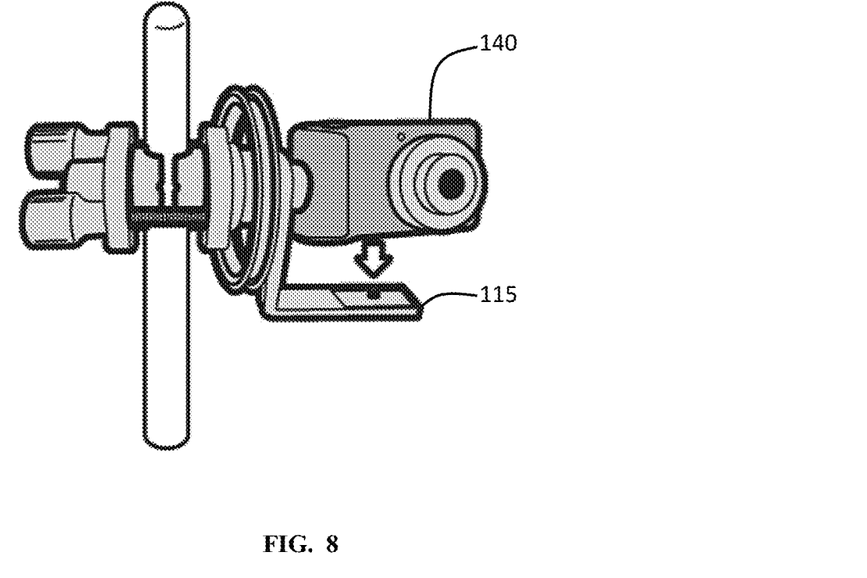
FIG. 8 is an illustration of a camera mount used with some embodiments of the present invention.
Figure 9:
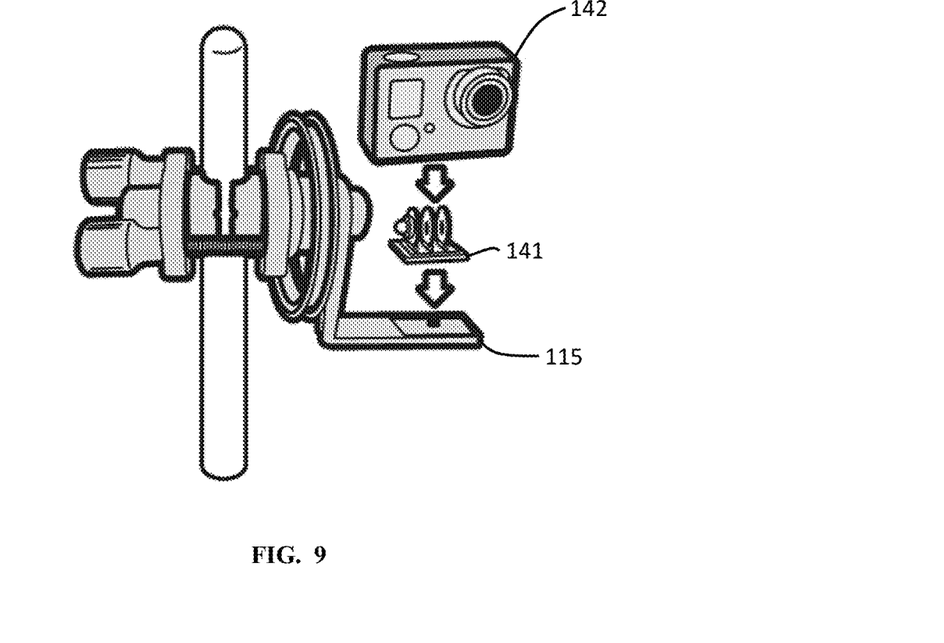
FIG. 9 is an illustration of a camera mount used with some embodiments of the present invention.
Figure 10:
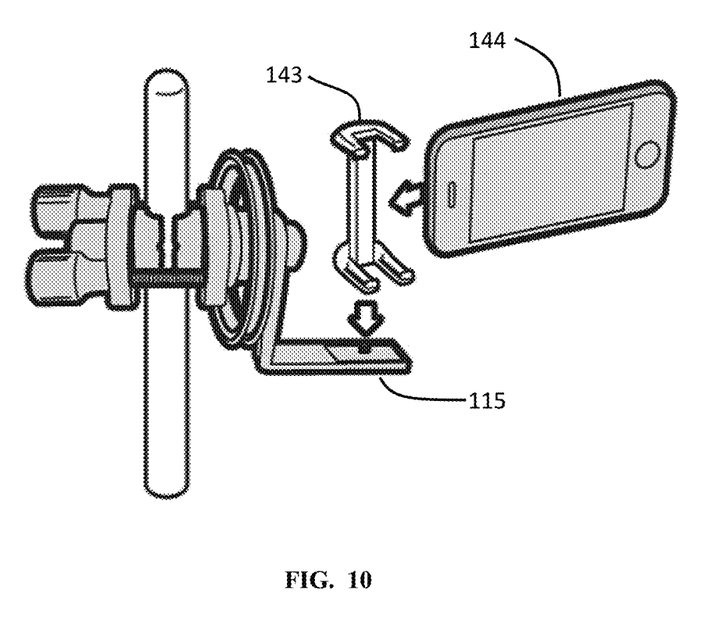
FIG. 10 is an illustration of a camera mount used with some embodiments of the present invention.

FIGS. 8, 9, and 10 illustrate various devices and the way in which they may be attached to the device mount 115. In some aspects, as seen in FIG. 8, a camera 140 may be directly mounted onto the device mount 115. A threaded fastener may be used to attach the camera 140. In some aspects, as seen in FIG. 9, a camera 142 may be affixed to a mount 141, which has been attached to the device mount 115. In some aspects, a grip clip 143 may be attached to the device mount 115. A device such as a cell phone 144 may be mounted within the grip clip 143. In all cases, the device is able to be supported with the extendable viewing system, and the device is able to be rotated in concert with a rotation of the twist handle 111 by the user.

Figure 11:
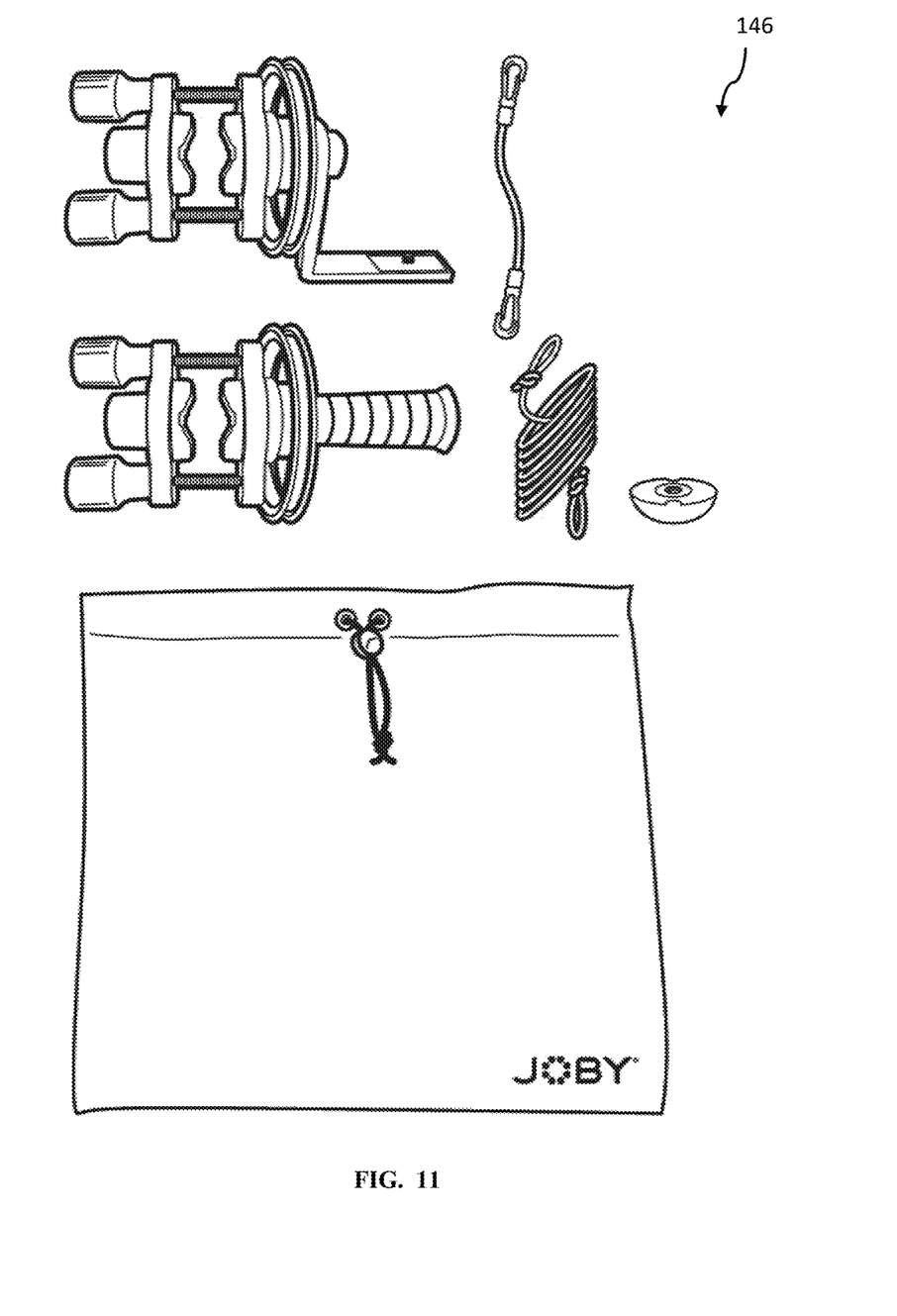
FIG. 11 is an illustration of a kit for an extendable viewing system according to some embodiments of the present invention.
Figure 12:
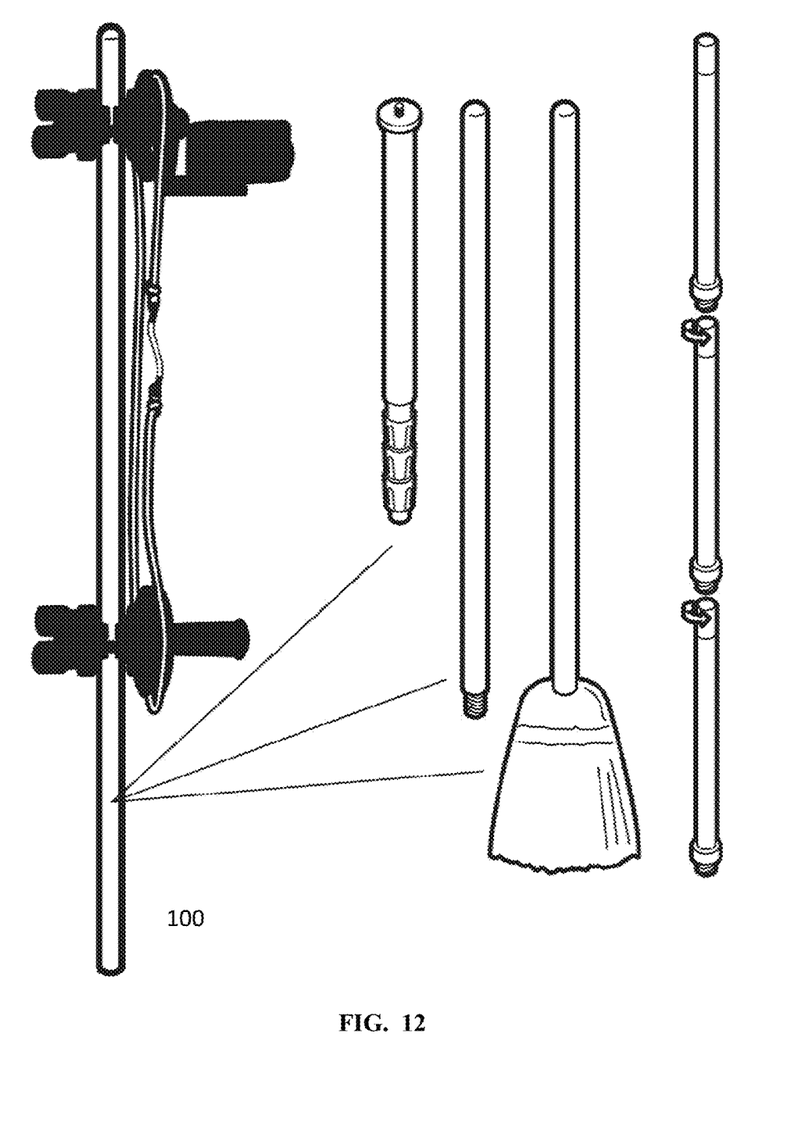
FIG. 12 illustrates poles for use with an extendable viewing system according to some embodiments of the present invention.

FIG. 11 illustrates a kit 146 which contains the various pieces of the extendable viewing system. FIG. 12 illustrates various types of support rods. Among the advantages of the extendable viewing system is that an extendable (and retractable) support rod can be used as part of a kit, so that all of the pieces are small and manageable.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An extendable viewing system, said extendable viewing system comprising:
    a drive unit, said drive unit comprising:
        a twist handle; and
        a drive pulley; and
        a rod mounting portion;
    a driven unit, said driven unit comprising:
        an end pulley;
        a device mount and a rod mounting portion;
    a support rod, wherein said drive unit and said driven unit are mounted onto said support rod; and
    a drive cord, said drive cord adapted to couple said drive pulley to said end pulley, wherein said drive cord comprises:
        a cord main portion, said cord main portion having a first end and a second end; and
        a cord attachment portion, said cord attachment portion adapted to join said first end of said cord main portion to said second end of said cord main portion into a continuous cord loop.

2. An extendable viewing system, said extendable viewing system comprising:
    a drive unit, said drive unit comprising:
        a twist handle; and
        a drive pulley; and
        a rod mounting portion;
    a driven unit, said driven unit comprising:
        an end pulley;
        a device mount; and
        a rod mounting portion; and
    a drive cord, said drive cord adapted to couple said drive pulley to said end pulley, wherein said drive cord comprises:
        a cord main portion, said cord main portion having a first end and a second end; and
        a cord attachment portion, said cord attachment portion adapted to join said first end of said cord main portion to said second end of said cord main portion into a continuous cord loop.

* * * * *